United States Patent
Hei et al.

(10) Patent No.: US 7,891,732 B2
(45) Date of Patent: Feb. 22, 2011

(54) EXTENDABLE SUNSHADE FOR CHILD CAR SEAT

(75) Inventors: Joseph Hei, Palo Alto, CA (US); Hoi Ning Wong, San Francisco, CA (US); Bryan Thomas White, Fremont, CA (US)

(73) Assignee: Orbit Baby, Inc., Newark, CA (US)

( * ) Notice: Subject to any disclaimer, the term of this patent is extended or adjusted under 35 U.S.C. 154(b) by 0 days.

(21) Appl. No.: 11/800,901

(22) Filed: May 7, 2007

(65) Prior Publication Data

US 2007/0257526 A1 Nov. 8, 2007

Related U.S. Application Data

(60) Provisional application No. 60/797,953, filed on May 5, 2006.

(51) Int. Cl.
*A47D 15/00* (2006.01)
(52) U.S. Cl. .............................. 297/184.13; 297/184.17
(58) Field of Classification Search ............ 297/184.13, 297/184.17, 184.11, 184.14
See application file for complete search history.

(56) References Cited

U.S. PATENT DOCUMENTS

| | | | | |
|---|---|---|---|---|
| 778,330 A * | 12/1904 | Pend | ............................ | 296/79 |
| 1,339,527 A | 5/1920 | Sperling et al. | | |
| 1,412,935 A * | 4/1922 | Greenebaum | .................. | 5/416 |
| 2,546,843 A * | 3/1951 | Zigterman | ..................... | 5/416 |
| 4,027,915 A | 6/1977 | Anderson et al. | | |
| 4,579,385 A | 4/1986 | Koenig | | |
| 4,582,355 A * | 4/1986 | Hall | .......................... | 296/77.1 |
| 4,583,779 A | 4/1986 | Myers | | |
| 4,810,030 A | 3/1989 | Lewis | | |
| 4,947,883 A | 8/1990 | Mayo | | |
| 4,997,231 A | 3/1991 | Smith | | |
| 5,007,674 A | 4/1991 | Franc | | |
| 5,067,770 A | 11/1991 | Hassell, Jr. | | |
| 5,150,945 A | 9/1992 | Aupperlee et al. | | |
| 5,301,999 A | 4/1994 | Thompson et al. | | |
| 5,522,639 A | 6/1996 | Jaime | | |
| 5,730,490 A | 3/1998 | Mortenson | | |
| 5,975,558 A * | 11/1999 | Sittu | .......................... | 280/647 |
| 6,019,421 A * | 2/2000 | Roh | ....................... | 297/184.13 |
| 6,402,225 B1 * | 6/2002 | Hsia | ...................... | 296/107.02 |
| 6,584,937 B1 * | 7/2003 | Ludolph | ..................... | 119/453 |
| 2005/0258673 A1 * | 11/2005 | Kassai et al. | ........... | 297/184.13 |

* cited by examiner

*Primary Examiner*—Peter R. Brown
(74) *Attorney, Agent, or Firm*—Morrison & Foerster LLP

(57) ABSTRACT

An all weather sunshade system for infant carriers includes a main sunshade that is pivotally attached to the infant carrier and an integrally provided sunshade extension. The main sunshade is selectively deployable and includes curved semi-rigid members which support a fabric material and includes a front edge. A rear edge of the sunshade extension is secured along the front edge of the main sunshade structure and is sized and shaped so that it may be selectively drawn forward, when the main sunshade is fully deployed, and secured around a front portion of the infant carrier. In doing so, the sunshade extension remains taut following the contours defined by the shape of the front edge of the main sunshade and the perimeter shape of the front edge of the infant carrier.

2 Claims, 6 Drawing Sheets

EXTENDABLE SUNSHADE FOR CHILD CAR SEAT

CLAIM FOR PRIORITY

Applicant hereby claims priority based on provisional patent application No. 60/797,953, filed May 5, 2006 and entitled: "Extendable Sunshade for Child Car Seat". The content of the above-identified provisional patent application is hereby incorporated by reference in its entirety.

BACKGROUND OF THE INVENTION a) Field of the Invention

This patent application generally relates to devices for child care, and more particularly, to such devices that help protect a child from the elements during transportation.

b) Description of the Prior Art

It is common for child strollers, infant carriers, and car-seats (hereinafter "car-seats") to include various components to help protect a seated infant or child (hereinafter "child") from local environmental factors, such as sunlight, wind and even rain, which, if left unabated can easily injure the seated child, or at least likely cause discomfort.

Most of today's commercially available devices used to transport a child, including car-seats and strollers, include a selectively deployable visor, hood, or sunshade (hereinafter "sunshade"), which is usually made up of a hood-shaped section of weather-proof fabric or plastic which is secured and supported by a series of curved semi-rigid members which mechanically interact with each other at common pivot points and collectively allow the secured hood to be deployed so that the head portion of the child can be covered.

An obvious limitation of this type of protective device is that only a small portion of the child is protected and even that protection has limited effectiveness because the sunshade can only be deployed along a single line of movement.

It is common for parents to drape a towel or blanket over the deployed sunshade of the car-seat or stroller to help block sunlight and wind from breaching the semi-rigid hood structure and reaching the seated child. Although the intentions are honorable, this method of shanty-protection is fraught with problems and can even be dangerous to the child. The towel or blanket rarely stays where it should, often shifting in the wind, and can easily fall into the child compartment, possibly covering the child's face and causing inadvertent injury to the child.

Thus, there is a need for a cover, beyond existing sunshades, which will shield an infant from the glare of the sun and other environmental factors while traveling in a car, or traveling while strolling.

Yet another problem common when parents travel with a child, either in a stroller in an automobile with a car-seat, is the existence of flies and other insects which may disturb the child, either by entering the stroller area where the child is seated or by entering the automobile if a window is left open. Flies or other insects can often carry diseases which can harm the child. Most sunshades which are commonly available on the market, however, provide no protection to the child from such insects. Additionally, other insects such as wasps and bees may sting the child and may cause serious health problems if the child is allergic to bee stings or wasp stings.

Still another concern with child car-seats is that the child is not protected from the wind or precipitation during the process of removing the child, in the car-seat, from the car. While within a car, a child will generally not be tightly bundled in a blanket or have a coat on due to the concerns of the child overheating. However, as soon as the vehicle stops and the door is open, the child is subject to cold weather, rain, snow, etc. Thus, it is desirable to have a cover for an infant carrier which will protect the child from the elements without the need for dressing and undressing the child every time the child is moved into and out of the vehicle.

Still another concern for parents of young children is unwanted touching. Often strangers or friends will approach a child and play with the child's hands or face. While the strangers, etc., are generally well meaning, any germs on their hands will be communicated to the child. When the child places his hands in his mouth, the germs will be ingested. A well meaning stranger or friend can readily communicate a cold, the flu, or other infections to the child. Thus, it is desirable to provide a cover which inhibits the ability of others to touch the child without the express consent of the parent.

Still yet another concern which is common for parents of a child while riding in a car seat is that the child may easily become bored and begin to cry. Numerous accidents have been caused by a driver attempting to look at or touch a child to calm them when agitated. While a child can often be entertained with various toys, an uncovered child car-seat allows the toy to fall or be thrown from the carrier. To return the toy to the car-seat, the driver must usually take his or her eyes off the road, thereby increasing the likelihood of an accident.

Numerous attempts have been made to protect a child from the sun and to otherwise provide entertainment to the child. One common device for shielding children from sun is a small round sun screen which sticks to a window. However, each screen only blocks the sun from one direction. When the vehicle changes direction, the sun's direct rays come through the window from a different location or from a different window altogether. Not only does the sun screen not work at keeping the sun out of the child's eyes, it obstructs the driver's view somewhat and has to be removed altogether at night.

One such prior art invention exists is U.S. Pat. No. 5,730,490 of Mortenson. This patent discloses a device that claims to protect an infant from weather and insects while the infant is seated in any type of infant carrier. Unfortunately, this device requires the use of handle of the infant carrier to support the carrier cover and form a tent over the carrier. One main disadvantage to this type of cover is that it cannot be used in a moving vehicle as the manufacturers of infant carriers suggest the handle be locked in place in the horizontal position behind the carrier. Therefore, it provides limited protection from the sun or insects while in a moving vehicle.

U.S. Pat. No. 5,522,639 of Jaime incorporates the use of dual sun shade devices which attach to the U-shaped handle. This device also requires the use of the U-shaped handle for attachment of the sun visor and only covers half of the carrier allowing incomplete sun protection.

U.S. Pat. No. 5,007,674 of Franc does not require the use of the U-shaped carrier handle and could thus be used in a moving vehicle. However, its use appears to be dependent upon fasteners which must be attached to the carrier cover by the consumer. It is also a single function device. It does not protect against precipitation, wind or insects.

U.S. Pat. No. 5,301,999 of Thompson et al. discloses a sun shade for use with a baby car-seat. However, the Thompson et al. device is impractical because it consists of a complex support structure which is positioned between the sun and the baby. In a moving vehicle, the Thompson et al. device would require continuous adjustment to keep the sun shade properly positioned as the car changes direction.

U.S. Pat. No. 4,997,231 of Smith discloses a sunshade apparatus that may require a seat equipped with a U-shaped handle. However, the Smith patent appears to only address sun protection, and when installed on the seat, the sunshade partially blocks the grip area of the handle. Partial blocking of the handle does not appear to allow for the sunshade's use on several type handle equipped automatic swing and glider seats. Several manufacturers' seat and carrier designs allow the handle to be folded below the seat to vary the seat's angle relative to a supporting surface. When a handle is used below the seat, a handle attachment of a sunshade or cover is not convenient.

U.S. Pat. No. 4,947,883 of Mayo discloses a sunshade apparatus that addresses protection against sun for a seated baby by providing a wrap around channel of photochromic material mounted between the baby and the sun. The Mayo apparatus appears complex, bulky, and seems to address only sun protection.

U.S. Pat. No. 1,339,527 of Sperlling et al. shows a collapsible screen for baby carriages which has sideflaps and is rollably stored.

U.S. Pat. No. 1,412,935 of Greenebaum shows a baby carriage screen as foot and head portions which are attached to the handle in the middle of the carriage.

U.S. Pat. No. 4,027,915 of Anderson et al. describes a sun shield assembly for detachable attachment to an infant's seat, comprising a pair of mounting brackets and a hood, which is mountable in the brackets, having a top wall and opposed side walls. The hood is made of a resilient material.

U.S. Pat. No. 4,579,385 of Koenig relates to an inflatable cushioning device having a first end adapted for attachment to the infant car seat behind the infant's head and to a seat in front of the infant, including sideflaps extending sufficiently downward from the portion just above the infant's head to protect the infant from strong sunlight and excessive heat. The cushioning device is preferably formed of a flexible plastic material of a color sufficiently dark to absorb an appreciable portion of sunlight incident thereon, thereby protecting the child from exposure to sunlight and resultant discomfort from excessive heat.

U.S. Pat. No. 4,583,779 of Myers shows a sun shade and protective cushion device for use with a conventional automobile child seat. The sun shade comprises a flexible sheetlike canopy which is generally horizontal in use and has a pocket formed at a first end for fitting over the top of the back of the infant's car seat and a means at a second end, opposite to the first end, for stretchably anchoring the canopy to a part of the car's interior that is spaced apart from the infant's car seat. A pair of side flaps also may extend along opposite sides of the canopy and be either in a raised position, flat atop the canopy, or in a generally downwardly lowered position.

U.S. Pat. No. 4,810,030 of Lewis describes a shade for use with infants and children car seats and the like having a seat and back member that fits into the seat and accommodates strap restraints and a hood that attaches to the seat and back member to project as a canopy from a back portion of the seat and back member. The device has a two-part construction including a flexible seat and back with connection means for the hood and pass-through openings for seat restraints.

U.S. Pat. No. 5,067,770 of Hassel, Jr. discloses a sun shield for a child's car seat which "consists of a single flat piece of pre-cut firm bendable material having a roof segment, a pair of side visor segments, a pair of support flap segments and a back segment, with a cut out gap area between each support flap segment and the back segment." The bendable material is standard gauge corrugated cardboard.

U.S. Pat. No. 5,150,945 of Auperlee et al. describes a removable cover for a car-seat to help protect the seat from sun exposure, but only when the seat is empty, such as when the car sits in a parking lot. The cover can be stowed in a pocket that is attached to the head-rest portion of the seat.

Although these prior art baby carriers provide several helpful features, there are additional problems that remain unsolved. Parents everywhere would benefit by a protective covering that, when deployed, protects an infant or child from inclement weather and sunlight and debris and wind, yet allows a parent to easily monitor the infant through the covering. The protective cover should be rapidly deployable and be easily fastened, and further should be easily and quickly stowable in such a manner that maintains the aesthetic qualities of the overall car-seat (or infant carrier) whenever the protective cover is not being used. The protective cover should also not interfere with any of the operational components of the infant carrier (or car-seat), in particular, the handles.

In short, there is a need for a car-seat cover which protects a seated infant from sun, wind, inclement weather and insects both inside and out of a moving vehicle that is easy to manufacture and use.

SUMMARY OF THE INVENTION

Thus, it is an object of the present invention to provide an improved cover for an infant carrier, car-seat, and the like.

It is another object of the present invention to provide such a cover which protects a child from sun, wind, inclement weather, falling debris, insects and other intrusions.

It is yet another object of the present invention to provide a cover which can be used while a vehicle is in motion and which does not interfere with proper mounting of a car-seat to its base.

It is still yet another object of the present invention to provide such a cover that is quick and easy to deploy from a stowed position.

It is yet another object of the present invention to provide integral and aesthetically-concealed stowing of the cover within a portion of the car-seat when the cover is not in use.

The above and other objects of the present invention are achieved by an all weather main sunshade and integrally provided sunshade extension. The main sunshade is pivotally secured to a portion of the car-seat and is selectively deployable. The main sunshade preferably includes at least one curved semi-rigid member that supports a fabric material and defining a front edge. A rear edge of the sunshade extension is secured along the front edge of the main sunshade structure and is sized and shaped so that it may be selectively drawn forward, when the main sunshade is fully deployed, and secured around a front portion of the infant carrier or car-seat. In doing so, the sunshade extension remains taut following the contours defined by the shape of the front edge of the main sunshade and the perimeter shape of the front edge of the car-seat. An opposing front edge of the sunshade extension preferably includes an elastic band which assists in securing the sunshade extension to the car-seat; in addition, this same opposing front edge preferably includes mechanical fasteners such as snaps or buttons which assist in securing the sunshade to the car-seat. Also provided along the front edge of the main sunshade is a lip cover that is independently deployable a prescribed distance so that the sunshade extension may be rolled and positioned along the front edge of the main sunshade and selectively concealed by forward movement of the lip cover. The lip cover is preferably formed integrally with the main sunshade.

BRIEF DESCRIPTION OF THE DRAWINGS

Embodiments of the present invention will now be disclosed, by way of example, in reference to the following drawings in which.

DETAILED DESCRIPTION OF A PREFERRED EMBODIMENT

Figure 1:
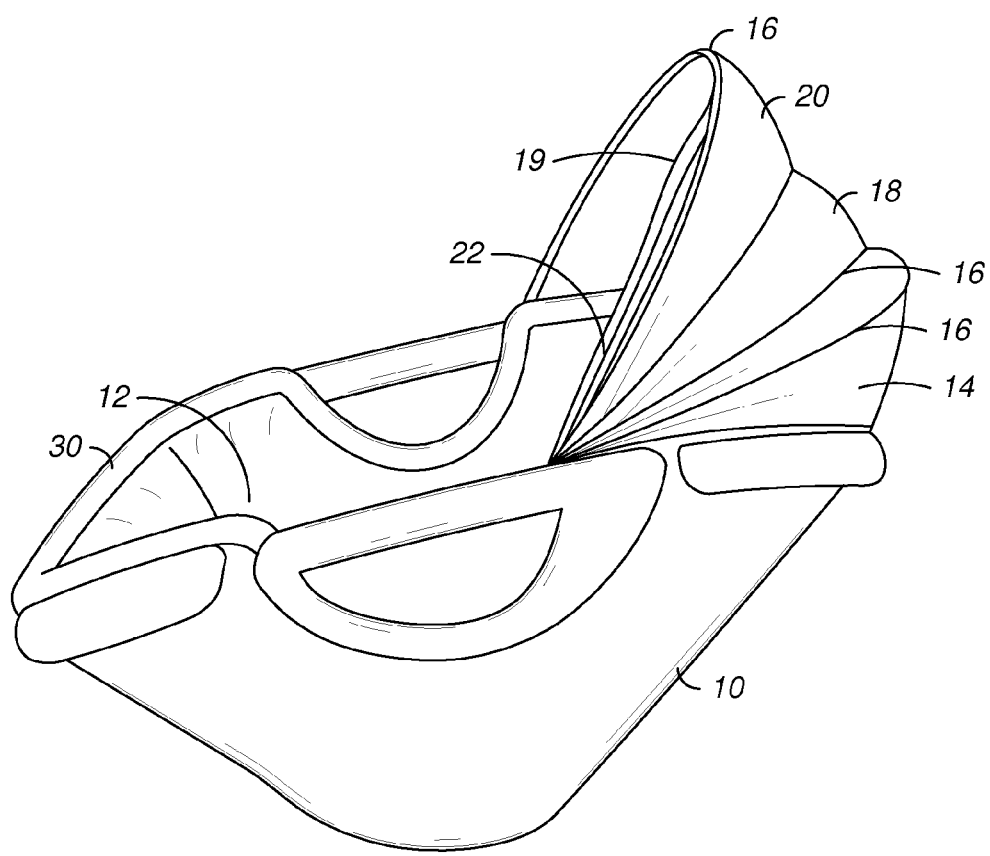
FIG. 1 is a side perspective view of a representative infant carrier car-seat showing a main sunshade having a forward lip cover, the main sunshade being located in a partially stowed position with respect to the infant carrier car-seat, according to the present invention.
Figure 2:
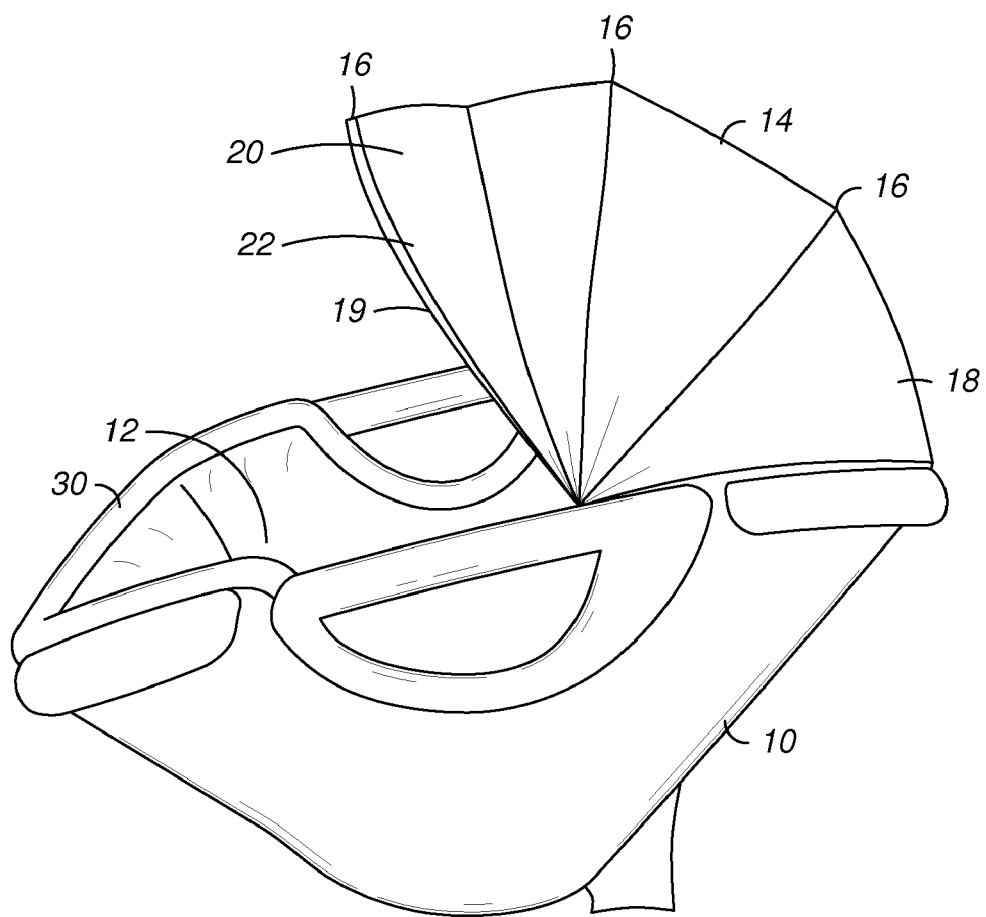
FIG. 2 is a side perspective view of the infant carrier car-seat of FIG. 1 showing the main sunshade in a deployed (upright) position, according to the present invention.

Referring to FIGS. 1 and 2, a representative car-seat (e.g., an infant carrier) 10 is shown having a base 12 into which a child may sit and a pivotally attached main sunshade 14. Main sunshade 14 is, in its basic function, somewhat conventional in that it includes at least 1, but typically 3 or 4, curved semi-rigid members 16 (not clearly shown under the fabric covering). The curved members 16 are pivotally attached to opposing sides of base 12 and support a fabric covering 18, defining a rim 19. Fabric covering 18 is preferably made from a water resistant/repellant textile material, such as canvas or a synthetic blend and is sufficiently flexible to allow free pivotal movement of the curved member 16 between a stowed position, shown in FIG. 1 and a deployed position, as shown in FIG. 2. In use, a child seated in car-seat 10 may be somewhat protected from the environment by deploying the main sunshade 14 to its deployed position (FIG. 2), or may be fully accessible by moving the sunshade 14 to its stowed position, perhaps when placing or removing the child from the car seat 10.

Figure 3:
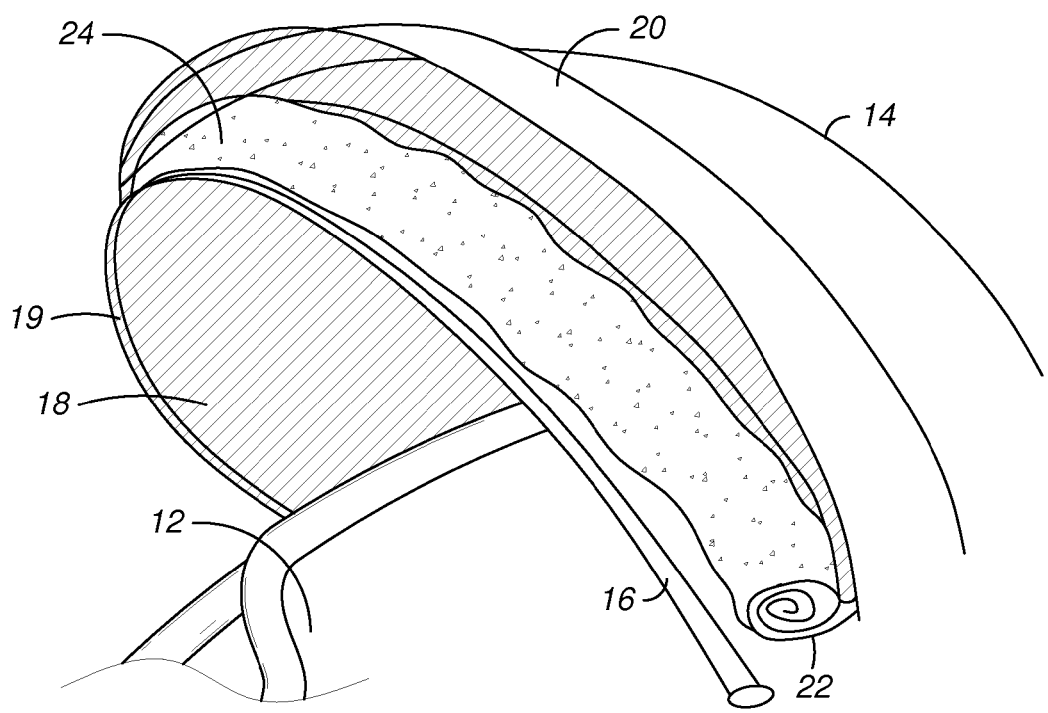
FIG. 3 is a partial perspective view of the main sunshade, showing details of a forward edge, a lip cover shown in a pulled-back position revealing an extension pocket and a sunshade extension panel in a rolled and stowed position within the extension pocket, according to the present invention.

As shown in FIG. 3, main sunshade 14 includes a rim cover 20 that is preferably formed integrally with the fabric covering 18. Rim cover 20 is sized and shaped to define a pocket or compartment 22, which, in turn, is sufficiently sized and shaped to accommodate the volume of a sunshade extension 24. Sunshade extension 24 is a predetermined shape and includes a rear secured edge 26 and a forward elastic edge 28.

Sunshade extension 24 is preferably made from a thin stretch fabric, but may be made of non-stretch fabric. It may be made opaque, translucent or clear and may be made from an elastic mesh or a tighter weave, but in either case, it should be breathable. Regardless, rear-secured edge 26 of sunshade extension 24 is preferably secured to fabric covering 18 of main sunshade 14 within pocket 22. Sunshade extension 24 may be sewn permanently to fabric covering 18 of main sunshade 14, or alternatively may be secured to fabric covering 18 within pocket any appropriate fasteners such as snaps, Velcro (loop/hook fastener), clips, zippers, buttons, ties, and magnets.

Furthermore, rim cover 20 may be secured to a closed position, when sunshade extension 24 is stowed within pocket 22, as shown in FIGS. 1 and 2, using a variety of fasteners, including snaps, Velcro (loop/hook fastener), clips, zippers, buttons, ties, and magnets.

Figure 4:
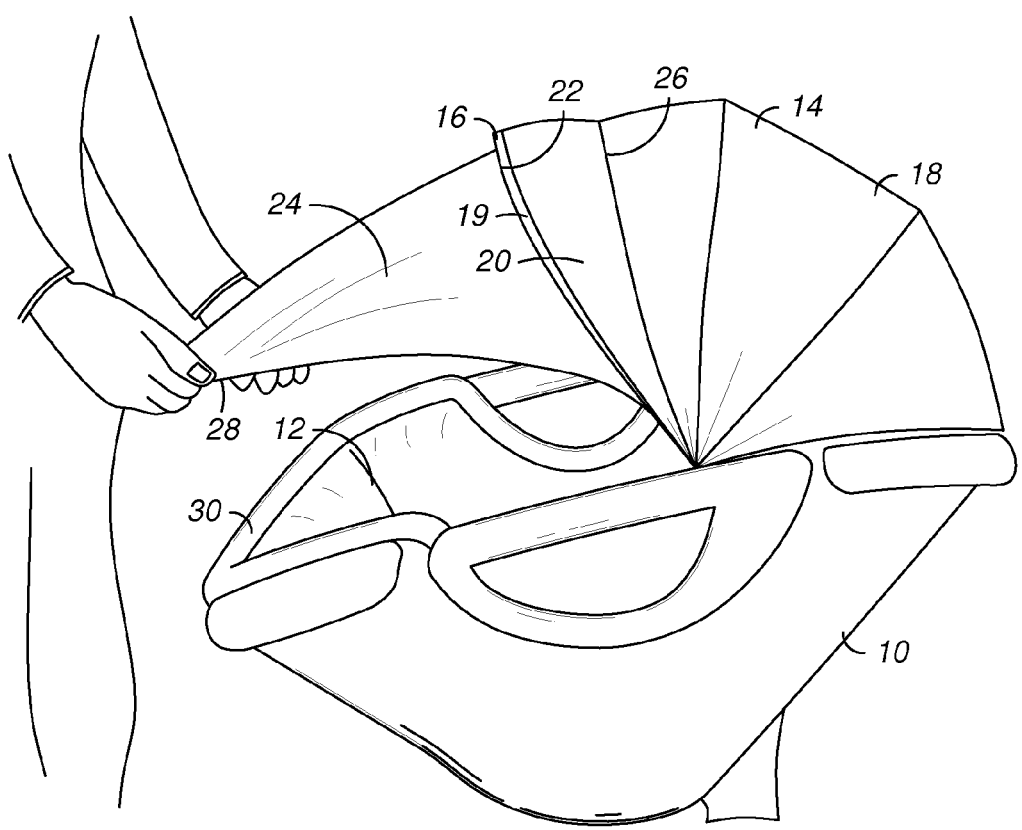
FIG. 4 is a side perspective view of the infant carrier of FIG. 2 showing deployment of the sunshade extension as a user pulls along a front edge of the sunshade extension, according to the invention.
Figure 5:
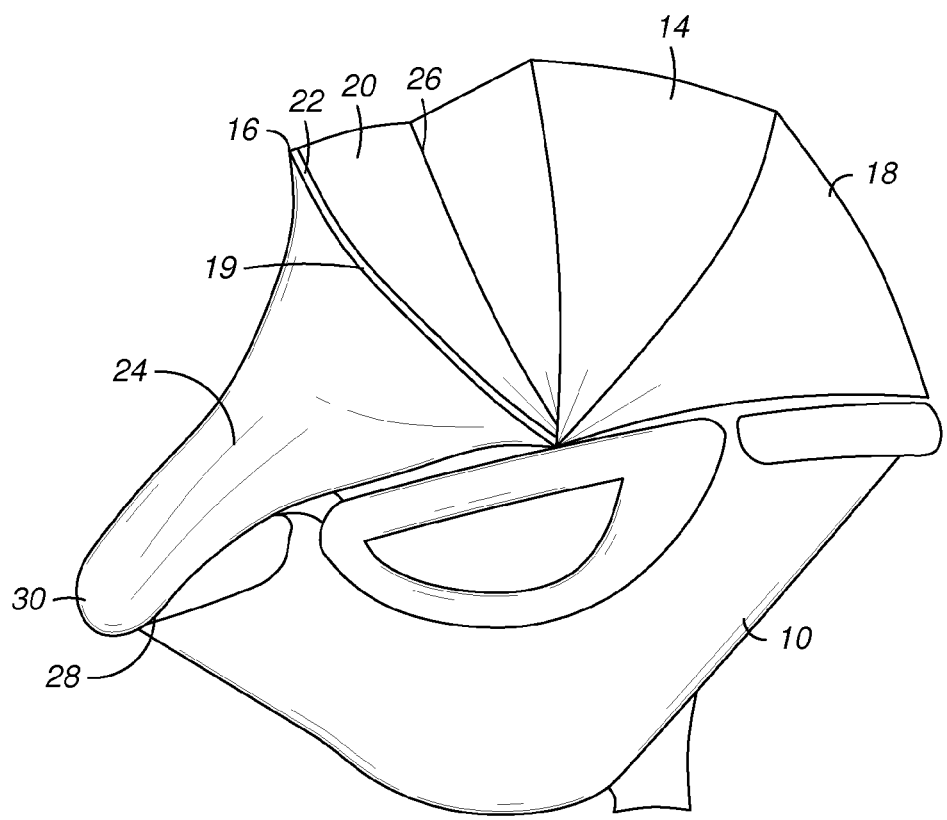
FIG. 5 is a side perspective view of the infant carrier of FIG. 2 showing the main sunshade and the sunshade extension fully deployed, according to the present invention.
Figure 6A:
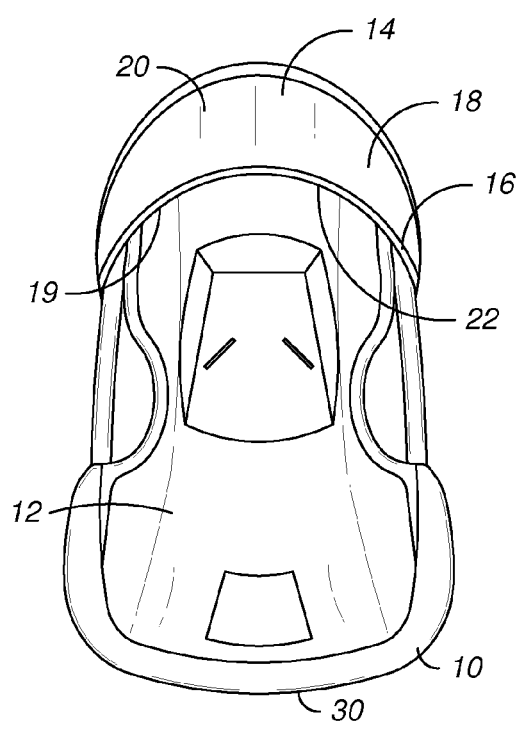
FIG. 6a is a top view of the infant carrier of FIG. 2 wherein the main sunshade is deployed and the sunshade extension remains stowed, according to the invention.
Figure 6B:
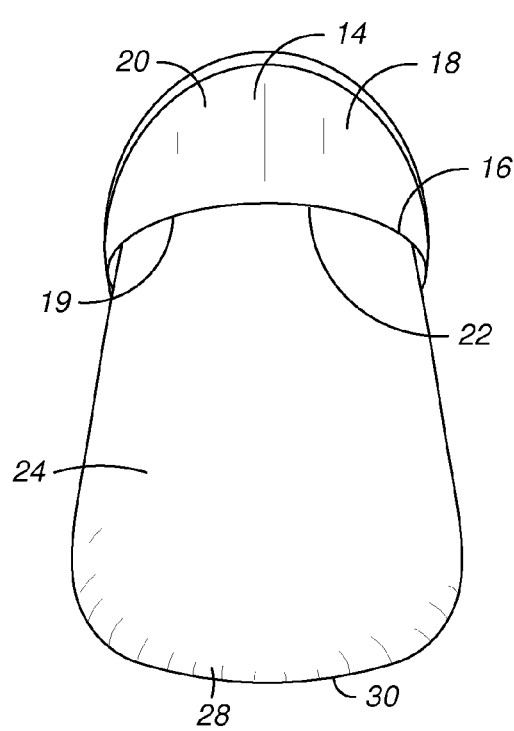
FIG. 6b is a top view of the infant carrier of FIG. 5 showing both the main sunshade and the sunshade extension fully deployed, according to the present invention, wherein the sunshade extension conforms to the shape of the front edge of the infant carrier car-seat.

As shown in FIG. 4, sunshade extension 24 may be selectively deployed (unrolled) from its stowed position within pocket 22 to a fully extended position, as shown in FIG. 5 by grasping forward elastic edge 28 of sunshade extension 24 and positioning the elastic edge 28 around a front edge 30 of base 12. Sunshade extension 24 is sized and shaped to create a spring-tight fit when fully deployed and secured to front edge 30 so that the elastic sunshade extension 24 conforms to the shapes defined by the rim 19 of main sunshade 14 and the shape of the front edge 28 of base 12, creating a tent-like structure in which a child may comfortably and safely reside. In other words, the fabric panel that makes up the sunshade extension 24 is smaller than its coverage area and must be stretched in order to secure to its intended location. The coverage of sunshade extension 24 is independent of the geometry of the main sunshade 14 and can therefore conform to the shape of the object (such as base 12) to which it extends and effectively envelopes.

Since the sunshade extension 24 includes forward elastic edge 28, it is self fitting and requires no additional fasteners. It is quickly and easily deployed from pocket 22 and secured about base 12, and since it normally resides within pocket 22, it will always be readily available when needed, but is normally hidden from view when stowed so that it does not otherwise detract from the overall appearance of the car seat. Also, rim cover 20 protects sunshade extension 24 when it is in the stowed position.

According to another embodiment of this invention, instead of sunshade extension 24 being mechanically secured to rim 19 of main sunshade 14, it may alternatively be secured to the side portions of base 12 or the front edge 30.

In use, when needed, a user may easily access pocket 22 by moving back rim cover 20 (first unfastening any fasteners used to secure rim cover closed) and thereafter unrolling or deploying the stowed sunshade extension 24 so that its front edge 28 may be grasped. The user then simply pulls the elastic front edge 28 of the sunshade extension 24 forward so that it extends around the front edge 30 of base 12. The user then releases the elastic edge so that it draws back tightly against the front edge of base 12.

Once in place, sunshade extension 24 keeps inclement weather, sunlight, wind, and even insects from disturbing the child. And, because the child is totally enclosed in his/her own little protective shell, he/she is not easily accessible to touching by strangers or other well meaning people. Thus, people (and animals) can easily "look but not touch."

What is claimed is:

1. A system comprising:

a car-seat comprising a base having a forward edge and defining a seat for a child to sit;

a selectively deployable primary sunshade structure, said primary sunshade structure having a forward edge and being pivotally attached to said base and selectively deployable between an open position wherein a head portion of a seated child is exposed to the surrounding elements, and a covering position, wherein the head portion of the seated child is covered and protected from surrounding elements; and a secondary sunshade having a rear edge that is secured to said forward edge of said primary sunshade structure and an elastic front edge, wherein:

the secondary sunshade is sized and shaped to selectively be movable between a usable position, wherein the secondary sunshade extends toward the front edge of the base, and a stowed position, wherein said secondary sunshade is selectively positioned adjacent to said forward edge of said primary sunshade structure, and the secondary sunshade comprises a stretchable material sized such that in an unstretched state the secondary sunshade does not extend to the front edge of the base and is operable to be stretched to and engage the forward edge of the base.

2. The sunshade system according to claim 1, wherein the secondary sunshade comprises a breathable material.

* * * * *